United States Patent
Kumar

(10) Patent No.: US 10,318,314 B2
(45) Date of Patent: Jun. 11, 2019

(54) TECHNIQUES FOR MANAGING SOFTWARE CONTAINER DEPENDENCIES

(71) Applicant: International Business Machines Corporation, Armonk, NY (US)

(72) Inventor: Kavitha Suresh Kumar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 79 days.

(21) Appl. No.: 15/442,417

(22) Filed: Feb. 24, 2017

(65) Prior Publication Data

US 2018/0246729 A1    Aug. 30, 2018

(51) Int. Cl.
*G06F 9/445* (2018.01)
*G06F 9/455* (2018.01)
*G06F 9/54* (2006.01)

(52) U.S. Cl.
CPC .............. *G06F 9/445* (2013.01); *G06F 9/455* (2013.01); *G06F 9/542* (2013.01); *G06F 2009/45579* (2013.01)

(58) Field of Classification Search
CPC ..... G06F 8/36; G06F 8/38; G06F 8/60; G06F 8/61; G06F 8/65; G06F 8/658; G06F 9/445; G06F 9/45558; G06F 9/5077; G06F 9/542; G06F 9/545; G06F 11/3495; G06F 17/30168; G06F 21/16; G06Q 50/184; H04L 41/06
USPC ...................................... 717/168–178; 718/1
See application file for complete search history.

(56) References Cited

U.S. PATENT DOCUMENTS

| | | | | |
|---|---|---|---|---|
| 8,776,047 B2* | 7/2014 | Wookey | ................. | G06F 8/658 717/175 |
| 8,862,933 B2* | 10/2014 | Manglik | ............... | G06F 9/5072 714/11 |
| 8,972,802 B2* | 3/2015 | Kashyap | ................ | G06F 9/485 714/2 |
| 8,990,608 B1* | 3/2015 | Gupta | ................ | G06F 11/2028 714/3 |
| 9,256,467 B1* | 2/2016 | Singh | .................... | G06F 9/5055 |
| 9,342,273 B1* | 5/2016 | Kumar | ..................... | G06F 8/20 |
| 9,600,269 B1* | 3/2017 | Bregler | .................... | G06F 8/60 |

(Continued)

OTHER PUBLICATIONS

L. Baresi and M. Miraz, "A Component-Oriented Metamodel for the Modernization of Software Applications," 2011 16th IEEE International Conference on Engineering of Complex Computer Systems, Las Vegas, NV, 2011, pp. 179-187. (Year: 2011).*

(Continued)

*Primary Examiner* — Andrew M. Lyons
(74) *Attorney, Agent, or Firm* — Patterson + Sheridan, LLP

(57) ABSTRACT

Techniques are disclosed for initializing an application composed of multiple software containers, where one or more of the software containers are associated with dependent software containers. A request is received to initialize the application. A dependency manager determines, from a map identifying associations between each of the software containers, whether a software container is associated with any dependent software containers. Upon determining that the software container is associated with dependent software containers, the dependency manager enables a notification setting in the software container. The dependency initializes the software container.

20 Claims, 6 Drawing Sheets

(56) References Cited

U.S. PATENT DOCUMENTS

| | | | |
|---|---|---|---|
| 9,916,233 B1* | 3/2018 | Qureshi | G06F 11/3692 |
| 9,986,031 B2* | 5/2018 | Jain | H04L 67/1095 |
| 2005/0050155 A1* | 3/2005 | McGee | H04L 29/06 |
| | | | 709/213 |
| 2005/0060722 A1* | 3/2005 | Rochette | G06F 8/60 |
| | | | 719/319 |
| 2005/0267856 A1* | 12/2005 | Woollen | G06F 8/61 |
| 2005/0278724 A1* | 12/2005 | Buskens | G06F 9/485 |
| | | | 719/310 |
| 2008/0201705 A1* | 8/2008 | Wookey | G06F 8/658 |
| | | | 717/175 |
| 2009/0132687 A1* | 5/2009 | Yue | H04H 20/95 |
| | | | 709/222 |
| 2013/0080350 A1* | 3/2013 | Bhola | G06Q 10/067 |
| | | | 705/348 |
| 2014/0337816 A1* | 11/2014 | Chiluvuri | G06F 8/36 |
| | | | 717/107 |
| 2015/0039770 A1* | 2/2015 | Manglik | G06F 9/5072 |
| | | | 709/226 |
| 2015/0128105 A1* | 5/2015 | Sethi | G06F 8/36 |
| | | | 717/106 |
| 2015/0324219 A1* | 11/2015 | Fitzgerald | G06F 8/60 |
| | | | 718/1 |
| 2016/0098285 A1* | 4/2016 | Davis | G06F 9/45545 |
| | | | 718/1 |
| 2016/0150053 A1* | 5/2016 | Janczuk | H04L 67/1097 |
| | | | 709/217 |
| 2016/0330277 A1* | 11/2016 | Jain | H04L 67/1095 |
| 2016/0342786 A1* | 11/2016 | Gerebe | G06F 21/52 |
| 2016/0378525 A1* | 12/2016 | Bjorkengren | G06F 9/45558 |
| | | | 718/1 |
| 2016/0380916 A1* | 12/2016 | Gnaneswaran | H04L 47/803 |
| | | | 709/224 |
| 2017/0093640 A1* | 3/2017 | Subramanian | H04L 41/12 |
| 2017/0093923 A1* | 3/2017 | Duan | H04L 63/1408 |
| 2017/0126469 A1* | 5/2017 | Liang | H04L 41/04 |
| 2017/0257432 A1* | 9/2017 | Fu | G06F 9/5072 |
| 2017/0315795 A1* | 11/2017 | Keller | G06F 8/63 |
| 2018/0121485 A1* | 5/2018 | Jayanthi | G06F 8/63 |

OTHER PUBLICATIONS

Sun-Hee Choe and H. S. Park, "CCP : Container for concurrency processing of robotics component," 2008 International Conference on Control, Automation and Systems, Seoul, 2008, pp. 2099-2102. (Year: 2008).*

M. Robert, Y. Sun, T. Goodwin, H. Turner, J. H. Reed and J. White, "Software Frameworks for SDR," in Proceedings of the IEEE, vol. 103, No. 3, pp. 452-475, Mar. 2015. (Year: 2015).*

* cited by examiner

TECHNIQUES FOR MANAGING SOFTWARE CONTAINER DEPENDENCIES

BACKGROUND

The present disclosure relates to software containers, and more specifically, to managing initialization of software containers that are associated with dependent software containers.

Generally, software containers are isolated user-space instances that wrap software in a complete filesystem. A software container includes components that are required to run the software, such as code, a runtime environment, system tools, system libraries, and so on. Doing so ensures that the software will always run in an identical manner regardless of the execution environment. When executed, the software container maintains its own CPU, memory, I/O, and network resources and shares the kernel of the host operating system. Software containers are fairly lightweight (e.g., compared to virtual machines which often require duplicate instances of the operating system as well as redundant boot volumes), so multiple software containers can be executed on the same hardware.

Software containers run as a distinct process. Therefore, a given application architecture that executes multiple processes typically requires a software container for each distinct process. For example, a software container may correspond to a web server application for a given application architecture, while another software container may correspond to a database application for that application architecture. Further, some processes in the application architecture may depend on other processes. For instance, a software container that corresponds to a member service may need to communicate with a controller service that is executed as part of another software container.

A container management application may coordinate the execution of software containers to ensure that the application runs reliably. However, one concern is efficiently starting software containers that depend on another software container to be fully initialized. For example, if a given software container is not yet fully initialized, then software containers that depend on that software container to be running may fail to initialize. Consequently, after failure, the container management application may repeatedly attempt to initialize the dependent software containers. Such an approach may result in wasted resources.

SUMMARY

One embodiment presented herein discloses a method. This method generally includes receiving a request to initialize an application comprising a plurality of distinct software containers. For at least a first software container in the plurality of software containers, (i) it is determined, from a map identifying associations between each of the software containers, whether the first software container is associated with at least one dependent software container in the plurality of software containers, and (ii) upon determining that the first software container is associated with the at least one dependent software container, a notification setting in the first software container is enabled.

Another embodiment presented herein discloses a computer program product including a computer-readable storage medium storing instructions, which, when executed on a processor, performs an operation. The operation itself generally includes receiving a request to initialize an application comprising a plurality of distinct software containers. For at least a first software container in the plurality of software containers, (i) it is determined, from a map identifying associations between each of the software containers, whether the first software container is associated with at least one dependent software container in the plurality of software containers, and (ii) upon determining that the first software container is associated with the at least one dependent software container, a notification setting in the first software container is enabled.

Yet another embodiment presented herein discloses a system. The system includes a processor and a memory storing program code, which, when executed on the processor, performs an operation. The operation itself generally includes receiving a request to initialize an application comprising a plurality of distinct software containers. For at least a first software container in the plurality of software containers, (i) it is determined, from a map identifying associations between each of the software containers, whether the first software container is associated with at least one dependent software container in the plurality of software containers, and (ii) upon determining that the first software container is associated with the at least one dependent software container, a notification setting in the first software container is enabled.

DETAILED DESCRIPTION

Embodiments presented herein disclose techniques for managing software container dependencies during initialization of an application that is composed of multiple software containers. In particular, a container management application executing on a computing system provides a dependency manager that evaluates container dependencies and builds a map of those dependencies. To do so, the dependency manager may retrieve a service configuration for the application that defines dependencies between underlying software containers. The service configuration may specify links between services provided by each software container. For example, the service configuration may indicate that a web service provided by one software container communicates with a port of a database service provided by another software container. The resulting map allows the dependency manager to identify software containers that need to be fully initialized prior to starting dependent software containers.

In one embodiment, prior to starting an application, the dependency manager evaluates the dependency map to identify software containers that are associated with dependent software containers. The dependency manager then enables a notification setting on the software container and starts the software container. The dependency manager may delay starting dependent software containers until the parent software container is fully initialized. The parent software container sends a notification to the dependency manager after initialization is complete. Thereafter, the dependency manager may start the dependent software containers. Doing so ensures that the initialization of the dependent software containers will not fail due to an incomplete initialization of the parent software container.

Advantageously, embodiments provide techniques that allow for efficient initialization in a given runtime environment. By maintaining a dependency map that identifies all software container dependencies, the dependency manager can automatically and intelligently enable notification settings in a given software container that is associated with identified dependencies. As a result, the dependency manager may delay initialization of identified dependent software containers until the parent software container has completed initialization. That is, rather than repeatedly attempt to initialize the dependent software containers, the dependency manager instead starts the dependent software containers after the parent software container is completely initialized.

Figure 1:
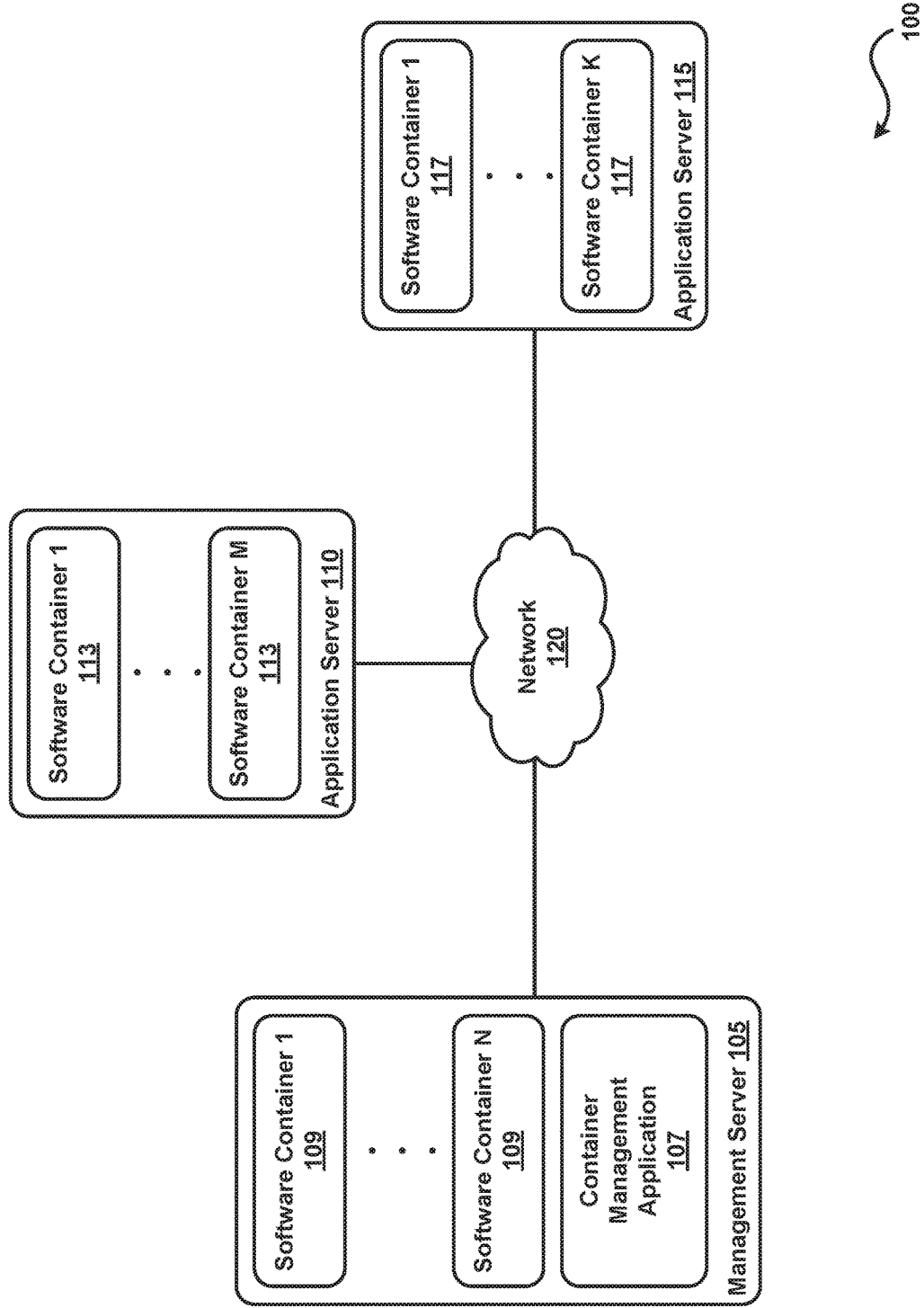
FIG. 1 illustrates an example computing environment, according to one embodiment.

FIG. 1 illustrates an example computing environment 100, according to one embodiment. As shown, the computing environment 100 includes a management server 105, application server 110, and an application server 115, each interconnected via a network 120. The network 120 may represent the Internet, a private cloud network, a wide area network, etc. Generally, the computing environment 100 represents an environment executing a given application composed of a number of software containers hosted by various computing systems, here, the management server 105 and application servers 110 and 115. In one embodiment, the management server 105 and application servers 110 and 115 are physical computing systems or virtual computing instances executing in a cloud network.

The management server 105 includes a container management application 107 and one or more software containers 1-N. 109. The application server 110 includes one or more software containers 1-M 113. The application server 115 includes one or more software containers 1-K 117. Each software container executing on a given computing system shares the same operating system kernel. Each of the software containers 109, 113, and 117 may correspond to a particular component or service of the application. Generally, a software container wraps a software process, service, or the like to a complete filesystem. The software container may include code, a runtime environment, system tools, system libraries, etc. The software container maintains system resources in isolation, such as CPU, memory, I/O, network resources, and so on.

For example, a given software container 109 may correspond to a management service that maintains an application configuration for other services. The management service could also monitor the status of services executing in the application environment and control deployments of the application in node instances. As another example, a given software container 113 may correspond to an application server node that performs a particular server function for the application. The software container 117 may similarly correspond to another server function for the application. Of course, one of skill in the art will recognize that the configuration of software containers to a particular system may vary based on need and also based on the application.

In one embodiment, the container management application 107 manages the execution of each of the software containers running in the computing environment 100. A user (e.g., a system administrator) may enable or disable the execution of particular software containers in the environment via the container management application 107, e.g., to update or reboot a given application process provided by a software container. Further, as described below, the container management application 107 may control the initialization of software containers based on dependencies between each software container to prevent unnecessary failures of dependent software containers.

Figure 2:
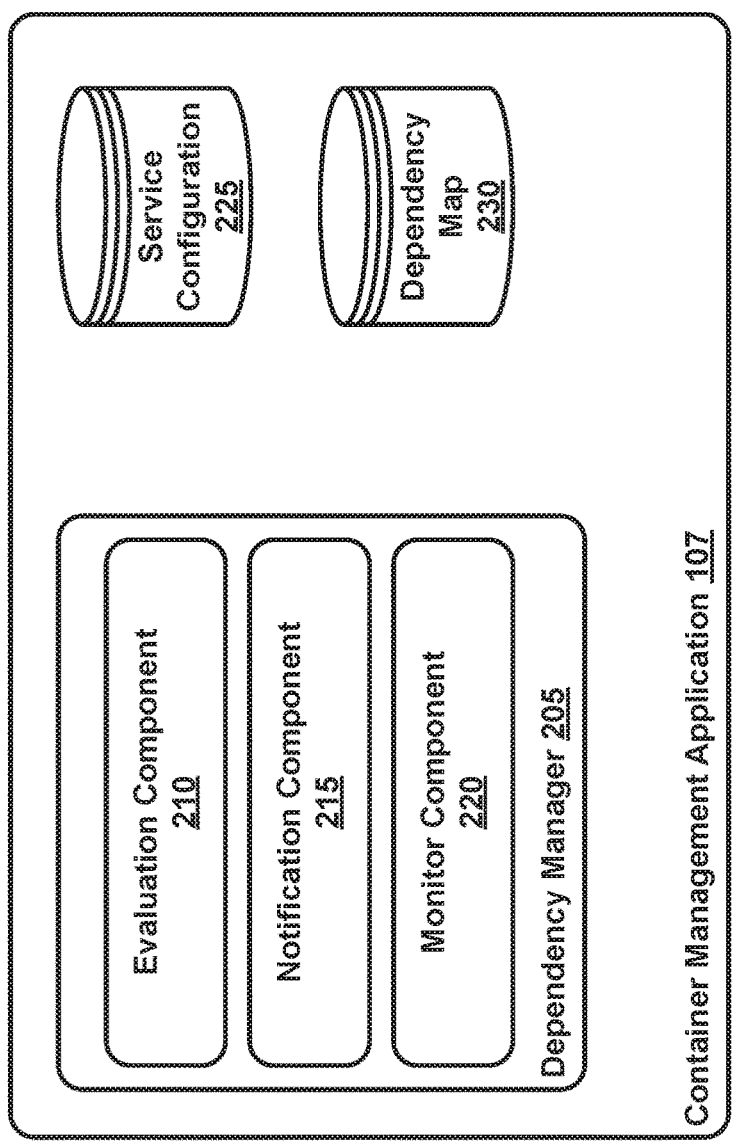
FIG. 2 illustrates the container management application discussed relative to FIG. 1, according to one embodiment.

FIG. 2 illustrates the container management application 107 discussed relative to FIG. 1, according to one embodiment. As shown, the container management application 107 includes a dependency manager 205, a service configuration 225, and a dependency map 230. The dependency manager 205 itself includes an evaluation component 210, notification component 215, and a monitor component 220. Of course, FIG. 2 merely represents a conceptual diagram of an application that manages dependencies between software containers at startup. Other configurations of the application may also be applicable.

In one embodiment, the dependency manager 205 determines dependencies between software containers based on the service configuration 225. The service configuration 225 generally defines services, networks, and volumes to apply to each software container in the computing environment 100. The service configuration 225 may define software container names and roles served by each container. Further, the dependency manager 205 may identify associations between software containers specified in the service configuration 225. For example, the dependency manager 205 may identify, from the service configuration 225, a port number of a service provided by a software container that services in other software containers connect to at initialization. In one embodiment, the service configuration 225 may be represented as a YAML file, though other formats may be applicable (e.g., XML, text file, etc.).

In one embodiment, the dependency manager 205 stores identified associations as part of the dependency map 230. The dependency map 230 specifies dependent software containers for each software container in the computing environment 100. In one embodiment, the dependency map 230 may be represented as a database table, key-value store, etc. To build the dependency map 230, the evaluation component 210 may retrieve the service configuration 225 and identify each of the software containers in the computing environment 100, as specified in the service configuration 225. The evaluation component 210 may then identify dependencies between each of the software containers and populate the dependency map with those dependencies.

In one embodiment, the notification component 215 may identify, from the dependency map 230, software containers in the computing environment 100 that are associated with dependent software containers. Once identified, the notification component 215 may enable a notification setting in a given software container. If enabled during initialization of the application, the software container may notify the dependency manager 205 that the software container has completed initialization.

The monitor component 220 receives notifications from parent software containers that are fully initialized during startup of the application. Once a notification is received from a given software container, the monitor component 220 may determine software containers that are dependent to the notifying software container and whether to start those containers. For example, the evaluation component 210 may determine whether any of the dependent software containers are associated with other dependent containers, in which case, the dependency manager 205 may start those parent containers before the other containers.

Figure 3:
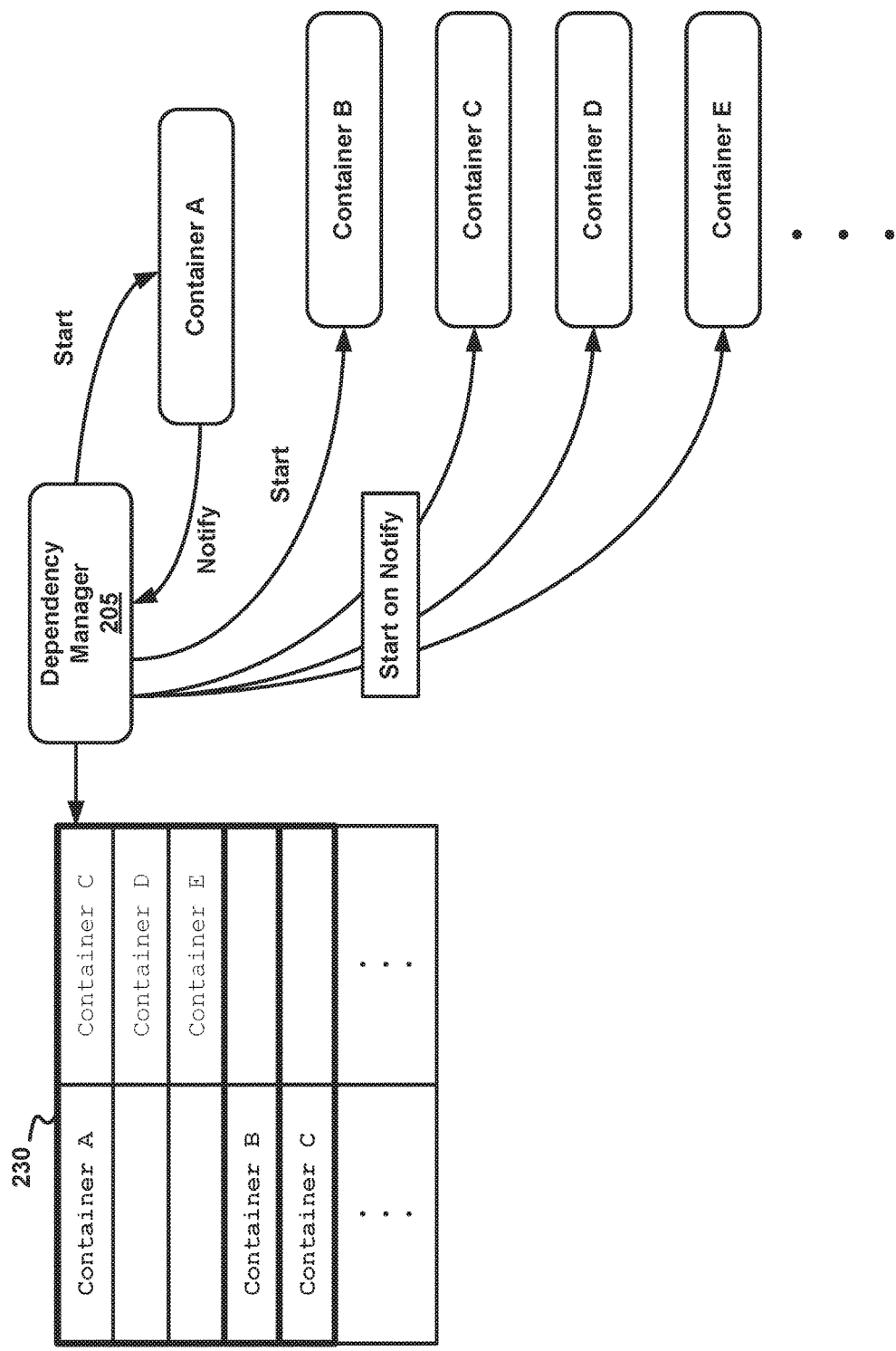
FIG. 3 illustrates an example initialization of a software container that is associated with dependent software containers, according to one embodiment.

FIG. 3 illustrates an example initialization of a software container that is associated with dependent software containers, according to one embodiment. As shown, FIG. 3 depicts the dependency manager 205, the dependency map 230, and multiple software containers including containers A-E.

Illustratively, the dependency map 230 displays a row-column table where the left column lists a given software container and the column lists dependencies associated with that software container. In this example, container A is associated with dependent software containers C, D, and E. At startup of the application provided by the software containers, the dependency manager 205 evaluates the dependency map to identify the dependent software containers. Doing so allows the dependency manager 205 to determine an order in which to start each of the software containers, such that software containers having dependencies are initialized before the dependency manager 205 starts the dependent containers.

As shown, the dependency map 230 indicates that containers C, D, and E depend on A. For example, this may be the case if container A includes files that the containers need to obtain from the process provided by container A during initialization (e.g., if container A represents a database server that provides data that a web server provided by container B needs). In such a case, the dependency manager 205 enables a notification setting on container A. When enabled, the dependency manager 205 waits for a notification from container A prior to starting any of the software containers that depend on that container, i.e., containers C, D, and E.

In the flow depicted towards the right-hand side of FIG. 3, the dependency manager 205 starts container A having the notification setting enabled and container B ("Start"). Container A initializes and notifies the dependency manager 205 ("Notify"). Once notified, the dependency manager 205 starts dependent software containers C, D, and E ("Start on Notify").

In some cases, dependent software containers may themselves be associated with dependent software containers. For example, assume that dependent software container D depends on software container C. In such a case, software container C would also be started with the notification setting enabled, and software container D would be started after software containers A and C were fully initialized and the containers A and C send a notification to dependency manager 205.

Figure 4:
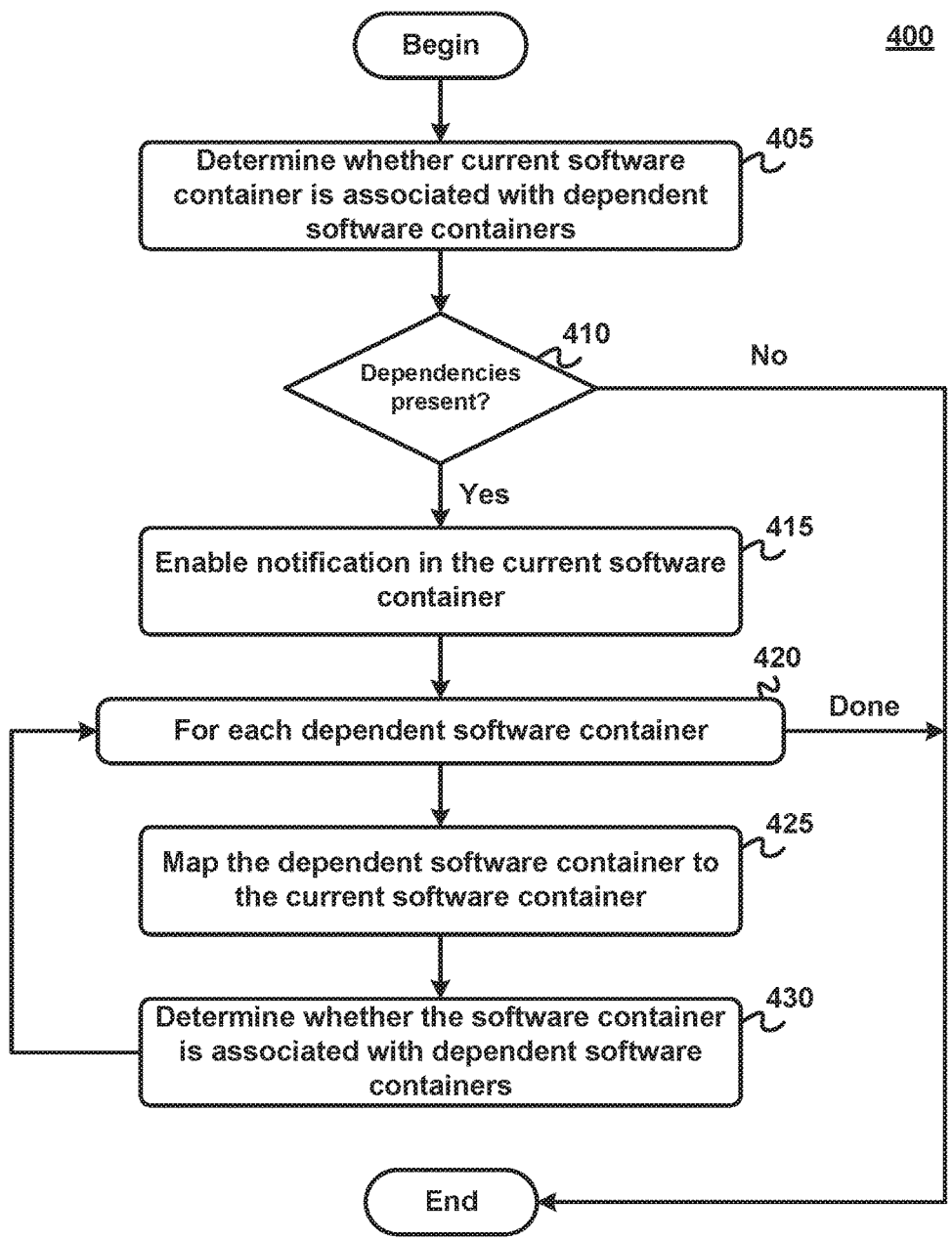
FIG. 4 illustrates a method for generating a dependency map of software containers, according to one embodiment.

FIG. 4 illustrates a method 400 for generating a dependency map of software containers, according to one embodiment. In this example, assume that the dependency manager is evaluating a given software container specified in the service configuration 225. Method 400 is carried out for each software container in the computing environment 100. As shown, method 400 begins at step 405, where the evaluation component 210 determines, based on the service configuration 225, whether the software container is associated with dependent software containers. For example, the evaluation component 210 may identify associations between the current software container with other software containers specified in the service configuration 225.

If dependencies are not present (at step 410), then the method 400 ends for that software container. In such a case, the dependency manager 205 initializes that container without the notification setting enabled. Otherwise (at step 410), then at step 415, the notification component 215 enables the notification setting in the software container. Then, at step 420, the method 400 enters a loop on steps 425 and 430 for each identified software container dependent to the parent software container.

At step 425, the dependency manager 205 maps the dependent software container to the current software container. The dependency manager 205 may retrieve the file corresponding to the dependency map 230, open the file, and associate the dependent software container with the current software container. The dependency manager 205 then, at step 430, determines whether the dependent software container itself is associated with any dependencies. In such a case, the dependency manager 205 may begin the method 400 for that dependent software container. The method 400 continues evaluating each dependent software container until complete.

Figure 5:
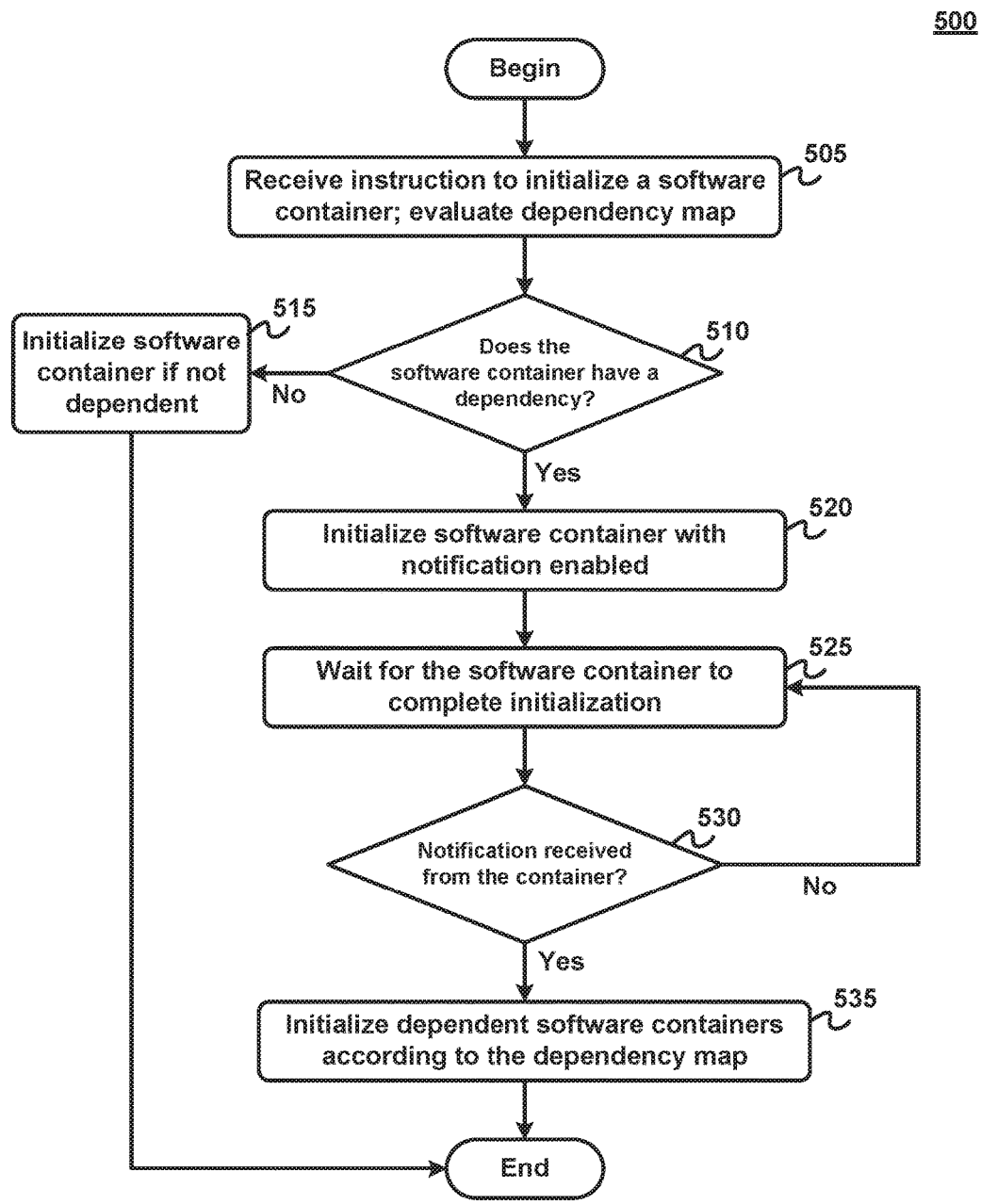
FIG. 5 illustrates a method for initializing a software container that is associated with dependent software containers, according to one embodiment.

FIG. 5 illustrates a method 500 for initializing a software container that is associated with dependent software containers, according to one embodiment. As shown, method 500 begins at step 505, where the dependency manager 205 receives an instruction to initialize a software container. For example, the instruction may be sent from the container management application 107 during startup of the underlying application.

At step 510, the dependency manager 205 determines whether the software container is associated with one or more dependencies. For example, to do so, the dependency manager 205 evaluates the software container against the dependency map 230 to identify any dependencies associated with the software container. If not, then at step 515, the dependency manager 205 initializes the software container if the software container is itself not dependent on any other software containers. If the software container is dependent on another software container, the dependency manager 205 waits until the parent software container sends a notification to the dependency manager 205 indicating that its initialization is complete. Once received, the dependency manager 205 initializes the dependent software container.

If the software container is associated with dependencies based on the evaluation of the dependency map 230, then at step 520, the dependency manager 205 enables the notification setting on the software container. The dependency manager 205 then initializes the software container (again, provided that the software container itself is not dependent on another software container, in which case the dependency manager 205 waits until a notification from the parent software container is received).

At step 525, the dependency manager 205 waits for the software container to complete initialization prior to starting the dependent software containers. At step 530, the dependency manager 205 monitors the status of the software container to determine whether a notification was received from the container. If not, then the dependency manager 205 continues to wait. If a notification is received, then at step 535, the dependency manager 205 initializes the dependent software containers according to the dependency map. The dependency manager 205 may initialize the software containers that do not depend on any additional containers pending initialization (in this case, the dependency manager 205 waits until the notification is received from those additional containers).

Figure 6:
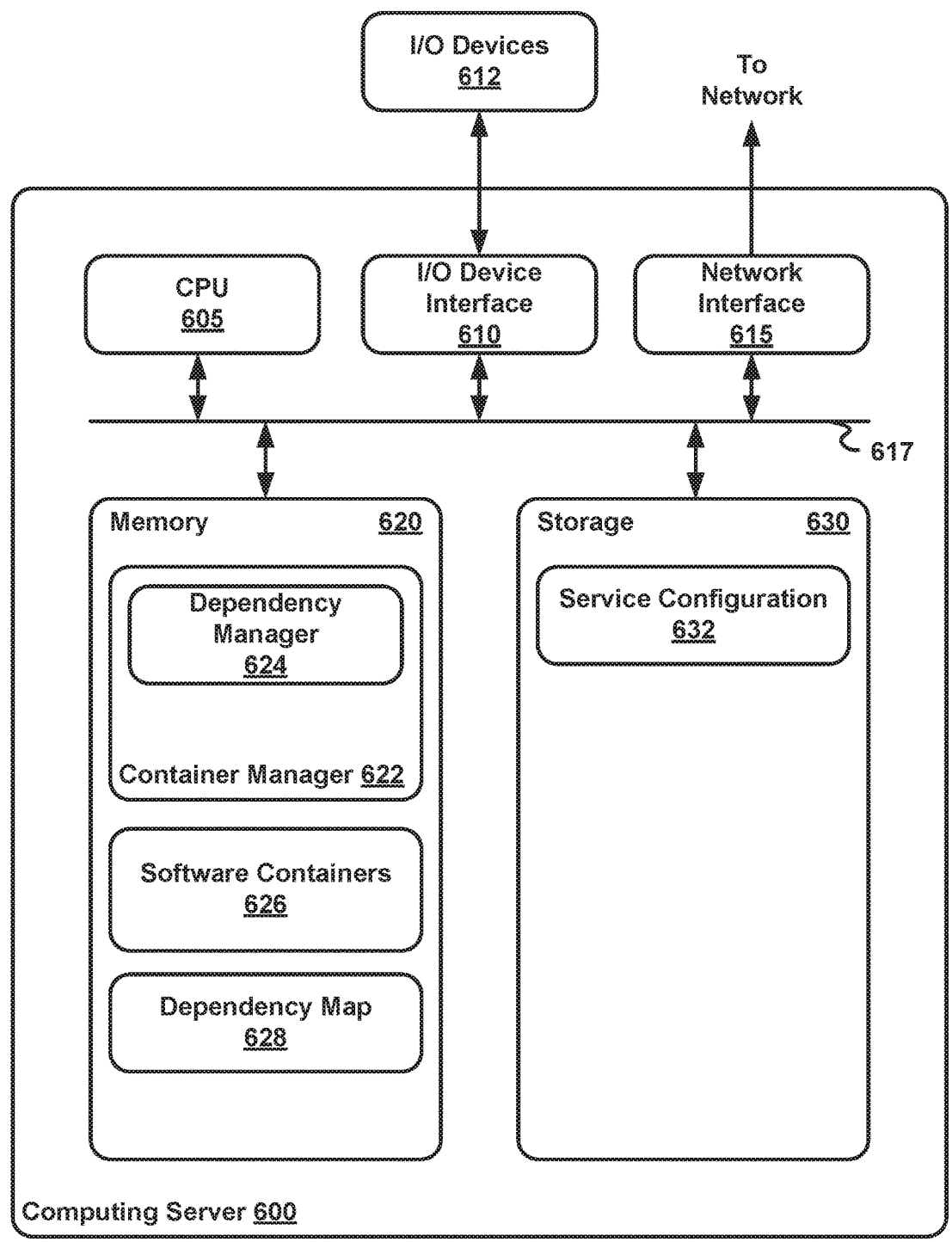
FIG. 6 illustrates an example computing system configured to manage software container dependencies, according to one embodiment.

FIG. 6 illustrates an example computing system configured to manage software container dependencies, according to one embodiment. As shown, the computing system 600 includes, without limitation, a central processing unit (CPU)

605, a network interface 615, a memory 620, and storage 630, each connected to a bus 617. The computing system 600 may also include an I/O device interface 610 connecting I/O devices 612 (e.g., keyboard, display, mouse devices, etc.) to the computing system 600. Further, in context of the present disclosure, the computing elements shown in the computing system 600 may correspond to a physical computing system (e.g., a system in an enterprise network) or a virtual computing instance.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, the memory 620 includes a container management application 622, which itself includes a dependency manager 624. The memory 620 also includes a number of software containers 626 and a dependency map 628. The storage 630 includes a service configuration 632. The container management application 622 executes the software containers 626 (including other software containers executing in the computing environment of the computing system 600) according to the service configuration 632.

In one embodiment, the dependency manager 624 controls the initialization of the software containers 626 based on a dependency map 628 that is built in part from the service configuration 632. For example, the dependency manager 624 identifies associations between the software containers 626 in which a process or service provided by a given software container depends on a process or service provided by another software container. The dependency manager 624 may include the identified associations in the dependency map 628. The dependency map 628 allows the dependency manager 624 to determine an order of initialization of the software containers.

In one embodiment, the dependency manager 624 initializes each of the software containers based on the dependencies provided in the dependency map 628. For a given software container, the dependency manager 624 determines, from the dependency map 628, whether the software container is associated with any dependent software containers. If so, the dependency manager 624 enables a notification setting in the software container, such that after the software container completes initialization, the software container notifies the dependency manager 624. Using the notification approach, the dependency manager 624 starts the software containers such that software containers are started only after parent software containers that are relied upon are fully initialized, i.e., after receiving a notification from parent software containers.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments presented herein may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications, such as the container management application, dependency manager, or related data available in the cloud. For example, the dependency manager could execute on a computing system in the cloud and identify dependencies between underlying processes, services, and the like that are provided in software containers. The dependency manager may then populate a dependency map with those identified dependencies. The dependency manager can store the dependency map at a storage location in a cloud network, e.g., a virtual private network hosted by a cloud provider. Doing so allows a user to access this information from any computing system attached to a network connected to the cloud (e.g., the Internet).

While the foregoing is directed to embodiments of the present disclosure, other and further embodiments may be devised without departing from the basic scope thereof, and the scope thereof is determined by the claims that follow.

What is claimed is:

1. A method comprising:
   generating a map identifying associations among a plurality of software containers, based on analyzing a service configuration to identify a dependent software container of the plurality of software containers that connects to a port of a first software container during an initialization of the dependent software container;

receiving a request to initialize an application comprising the plurality of software containers;

determining, from the map that the first software container is associated with the dependent software container, such that the dependent software container is dependent on the first software container;

upon determining that the first software container is associated with the dependent software container, enabling a first notification setting for the first software container, wherein the first notification setting instructs the first software container to transmit a notification upon completing initialization;

determining, from the map, that none of the plurality of software containers are dependent on a second software container of the plurality of software containers;

upon determining that none of the plurality of software containers are dependent on the second software container, refraining from enabling a second notification setting for the second software container;

initializing the first software container with the first notification setting, wherein the first software container transmits a notification upon completing initialization; and initializing the second software container without the second notification setting, wherein the second software container does not transmit a notification upon completing initialization.

2. The method of claim 1, further comprising:
receiving a notification from the first software container; and
upon receiving the notification from the first software container, initializing the dependent software container.

3. The method of claim 1, wherein the associations in the map are identified based on a service configuration associated with the application.

4. The method of claim 1, wherein the first software container provides a first service for the application.

5. The method of claim 4, wherein the dependent software container provides a second service for the application that depends on the first service to be initialized.

6. The method of claim 2, wherein the notification indicates that the first software container is initialized.

7. The method of claim 1, wherein the second software container does not transmit a notification upon initialization.

8. A computer program product, comprising:
a computer-readable storage medium storing instructions, which, when executed on a processor, performs an operation, comprising:
generating a map identifying associations among a plurality of software containers, based on analyzing a service configuration to identify a dependent software container of the plurality of software containers that connects to a port of a first software container during initialization;
receiving a request to initialize an application comprising a plurality of distinct software containers;
determining, from the map that the first software container is associated with the dependent software container, such that the dependent software container is dependent on the first software container;
upon determining that the first software container is associated with the dependent software container, enabling a first notification setting for the first software container, wherein the first notification setting instructs the first software container to transmit a notification upon completing initialization;
determining, from the map, that none of the plurality of software containers are dependent on a second software container of the plurality of software containers;
upon determining that none of the plurality of software containers are dependent on the second software container, refraining from enabling a second notification setting for the second software container;
initializing the first software container with the first notification setting, wherein the first software container transmits a notification upon completing initialization; and
initializing the second software container without the second notification setting, wherein the second software container does not transmit a notification upon completing initialization.

9. The computer program product of claim 8, wherein the operation further comprises:
receiving a notification from the first software container; and
upon receiving the notification from the first software container, initializing the dependent software container.

10. The computer program product of claim 8, wherein the associations in the map are identified based on a service configuration associated with the application.

11. The computer program product of claim 8, wherein the first software container provides a first service for the application.

12. The computer program product of claim 11, wherein the at least one dependent software container provides a second service for the application that depends on the first service to be initialized.

13. The computer program product of claim 8, wherein the notification indicates that the first software container is initialized.

14. The computer program product of claim 8, wherein the second software container does not transmit a notification upon initialization.

15. A system, comprising:
a processor; and
a memory storing program code, which, when executed on the processor, performs an operation, comprising:
generating a map identifying associations among a plurality of software containers, based on analyzing a service configuration to identify a dependent software container of the plurality of software containers that connects to a port of a first software container during initialization;
receiving a request to initialize an application comprising a plurality of distinct software containers;
determining, from the map that the first software container is associated with the dependent software container, such that the dependent software container is dependent on the first software container;
upon determining that the first software container is associated with the at least one dependent software container, enabling a first notification setting for the first software container, wherein the first notification setting instructs the first software container to transmit a notification upon completing initialization;
determining, from the map, that none of the plurality of software containers are dependent on a second software container of the plurality of software containers;

upon determining that none of the plurality of software containers are dependent on the second software container, refraining from enabling a second notification setting for the second software container;

initializing the first software container with the first notification setting, wherein the first software container transmits a notification upon completing initialization; and initializing the second software container without the second notification setting, wherein the second software container does not transmit a notification upon completing initialization.

16. The system of claim 15, wherein the operation further comprises:

receiving a notification from the first software container; and upon receiving the notification from the first software container, initializing the dependent software container.

17. The system of claim 15, wherein the associations in the map are identified based on a service configuration associated with the application.

18. The system of claim 15, wherein the first software container provides a first service for the application.

19. The system of claim 18, wherein the at least one dependent software container provides a second service for the application that depends on the first service to be initialized.

20. The system of claim 15, wherein the notification indicates that the first software container is initialized.

* * * * *